United States Patent
Ewing et al.

(10) Patent No.: US 7,852,820 B2
(45) Date of Patent: Dec. 14, 2010

(54) SYSTEMS AND METHODS FOR REDUCING DATA COLLISIONS IN WIRELESS NETWORK COMMUNICATIONS

(75) Inventors: David B. Ewing, Huntsville, AL (US); Kevin Banks, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 115 days.

(21) Appl. No.: 12/237,192

(22) Filed: Sep. 24, 2008

(65) Prior Publication Data

US 2009/0080455 A1    Mar. 26, 2009

Related U.S. Application Data

(60) Provisional application No. 60/974,836, filed on Sep. 24, 2007.

(51) Int. Cl.
*H04W 74/08* (2009.01)
(52) U.S. Cl. ........................... 370/338; 370/447
(58) Field of Classification Search ........................ None
See application file for complete search history.

(56) References Cited

U.S. PATENT DOCUMENTS

| | | | |
|---|---|---|---|
| 5,721,725 A | 2/1998 | Want et al. | |
| 7,068,702 B2 | 6/2006 | Chen et al. | |
| 7,206,319 B2 | 4/2007 | Li et al. | |
| 2005/0185666 A1* | 8/2005 | Raya et al. | 370/461 |
| 2007/0230378 A1* | 10/2007 | Tavares et al. | 370/310 |

OTHER PUBLICATIONS

Wireless LAN Medium Access Control (MAC) and Physical Layer (PHY) specifications, IEEE Std 802.11-1997, 1997, IEEE, pp. 1,34-45, 80-82.*

* cited by examiner

*Primary Examiner*—Steven H Nguyen
*Assistant Examiner*—Alex Skripnikov
(74) *Attorney, Agent, or Firm*—Lanier Ford Shaver & Payne, P.C.; Jon E. Holland

(57) ABSTRACT

The present disclosure generally relates to systems and methods for reducing data collisions in wireless networks. In one exemplary embodiment of the present disclosure, a node of a wireless network monitors traffic from at least one foreign network. The node attempts to identify patterns of communication in the foreign network. Based on an identified pattern, the node schedules a transmission during time period for which it is likely that the foreign network is not attempting a transmission that would otherwise interfere with the node's signal. Accordingly, the probability of a data collision is reduced.

15 Claims, 3 Drawing Sheets

SYSTEMS AND METHODS FOR REDUCING DATA COLLISIONS IN WIRELESS NETWORK COMMUNICATIONS

CROSS REFERENCE TO RELATED APPLICATION

This application claims priority to U.S. Provisional Patent Application No. 60/974,836, entitled "Wireless Communication Networks," and filed on Sep. 24, 2007, which is incorporated herein by reference.

RELATED ART

Wireless communication poses many significant challenges that must be addressed if robust and reliable communication is to be achieved. In this regard, wireless signals are susceptible to noise from various sources. For example, a node in a wireless network may attempt wireless transmission of a message at the same time as another node of the same network or a network of a foreign network. If the two nodes attempting simultaneous transmissions are within range of each other and at the same frequency, then the transmissions interfere with each other. Such an event is sometimes referred to as a "data collision." When a data collision occurs, it is likely that the colliding messages must be retransmitted in order to prevent data loss. However, retransmissions generally reduce the communication efficiency of a network, and in some cases, such as in real-time voice or video communication, retransmission is not feasible. Avoiding data collisions is generally desirable in order to enhance a network's efficiency.

Many collision avoidance techniques have been developed in an effort to reduce the occurrence of data collisions in wireless networks. Although such techniques have been successful in reducing the number of data collisions occurring within wireless networks, further reductions in data collisions are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to systems and methods for reducing data collisions in wireless networks. In one exemplary embodiment of the present disclosure, a node of a wireless network monitors traffic from at least one foreign network. The node attempts to identify patterns of communication in the foreign network. Based on an identified pattern, the node schedules a transmission during time period for which it is likely that the foreign network is not attempting a transmission that would otherwise interfere with the node's signal. Accordingly, the probability of a data collision is reduced.

Figure 1:
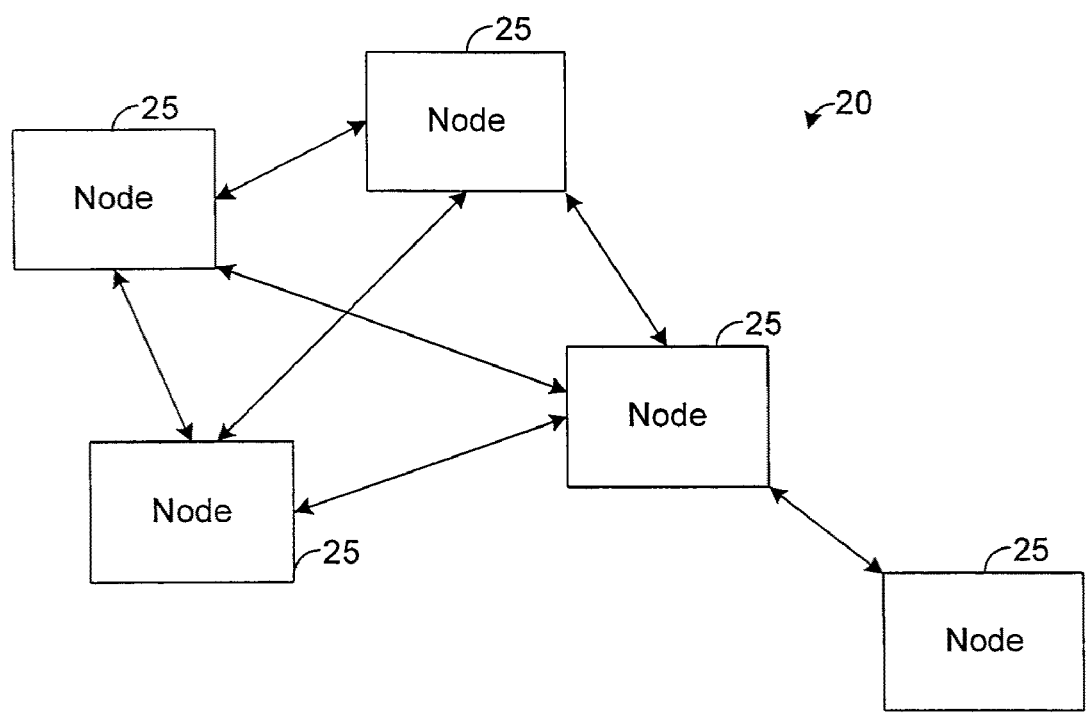
FIG. 1 is a block diagram illustrating an exemplary communication network in accordance with the present disclosure.

FIG. 1 depicts a communication network 20 in accordance with an exemplary embodiment of the present disclosure. As shown by FIG. 1, the network 20 has a plurality of nodes 25. The nodes 25 can be stationary or mobile. In one exemplary embodiment, the nodes 25 communicate with one another via wireless signals, but if desired, any of the nodes 25 may be coupled to any of the other nodes 25 and communicate via a physical medium.

In one exemplary embodiment, the network 20 is configured as a mesh network in which any of the nodes 25 may communicate directly or indirectly with any of the other nodes 25. In addition, the nodes 25 communicate wireless signals, such as radio frequency (RF) signals or signals in other frequency bands, according to I.E.E.E. 802.15.4 or other types of known protocols. Other types of networks may be employed in other embodiments. Various wireless networks are described in U.S. Provisional Patent Application No. 60/953,630, entitled "Sensor Networks," and filed on Aug. 2, 2007, which is incorporated herein by reference. Various wireless networks are also described in U.S. Provisional Patent Application No. 61/099,453, entitled "Systems and Methods for Controlling Wireless Sensor Networks," and filed on May 2, 2008, which is incorporated herein by reference. Wireless networks are further described in U.S. patent application Ser. No. 12/114,566, entitled "Systems and Methods for Dynamically Configuring Node Behavior in a Sensor Network," and filed on May 2, 2008, which is incorporated herein by reference. As will be described in more detail hereafter, voice data and/or other types of data, such as sensor data, can be routed through the nodes 25 of the network 20.

As described in U.S. Provisional Application No. 60/953, 630, repeaters (not shown) may be used to extend the communication range of the network 20. In addition, any of the nodes 25 may similarly regenerate signals and, therefore, function as a repeater.

Note that each node 25 is associated with a unique identifier, sometimes referred to as a "node address," that uniquely identifies such node from other nodes in the network 20. Any signal destined for a node preferably includes the node's unique identifier so that any node receiving the signal can determine whether it is the signal's destination. If it is the destination, then the node responds to the signal as appropriate. For example, if a message identifying a particular node 25 defines a command to perform an action, then the identified node 25, upon receiving the signal, may be configured to further process the signal based on the node identifier and to thereafter perform the commanded action.

In one exemplary embodiment, the network 20 is packet-based. Each data packet has a header, which includes various control information, such as the identifiers of the node or nodes that are to respond and process the packet, and a data portion, which includes payload data, such as voice data or other types of data. The packets may be communicated via any desired protocol. Note that more than one node identifier may be included in the header of a packet. For example, in one embodiment, the node identifier of the ultimate destination of the packet and the source of the packet are included in the header. In addition, if the packet is to hop through intermediate nodes before being received at its ultimate destination, the header includes the node identifier for the next hop (i.e., the next node 25 that is to receive the packet) within the network 20.

Figure 2:
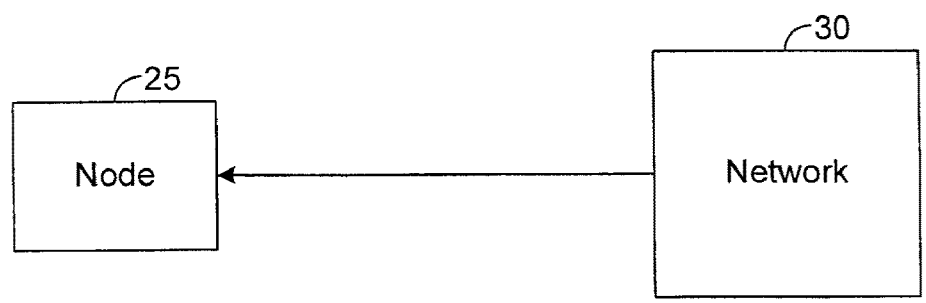
FIG. 2 is a block diagram illustrating a foreign network within communication range of a node of a wireless network, such as is depicted by FIG. 1.

The header also includes a network identifier that distinguishes the network 20 from other networks, referred to herein as "foreign networks," that may be within range of a node 25. For each received message, a node 25 checks the network identifier included in the message. If the network identifier identifies network 20, then the node 25 routes the message based on the node identifiers in the header. If another network is identified or if the identifier of network 20 cannot be located, then the node 25 does not route the message but instead discards it. In some instances, as shown by FIG. 2, a foreign network 30 is located close enough to a node 25 such that the node 25 receives messages transmitted by the foreign network 30. Such messages may collide with transmissions from the node 25, and it is generally desirable to reduce or eliminate such data collisions.

When a message is transmitted from a node 25, referred to hereafter as the "transmitting node," to another node, referred to hereafter as the "receiving node," the receiving node 25 transmits an acknowledgement back to the transmitting node 25 indicating that the message has been received. If the transmitting node 25 does not receive such an acknowledgement within a certain time period after transmitting the message, then the transmitting node 25 assumes that the message has not been successfully received and attempts to retransmit the message. The transmitting node 25 will continue retransmitting the message until it receives an acknowledgement for the message or once a predefined number of retransmissions have been attempted. The use of acknowledgements to enhance the robustness and reliability of a network is generally well-known and will not be described in detail herein.

Figure 3:
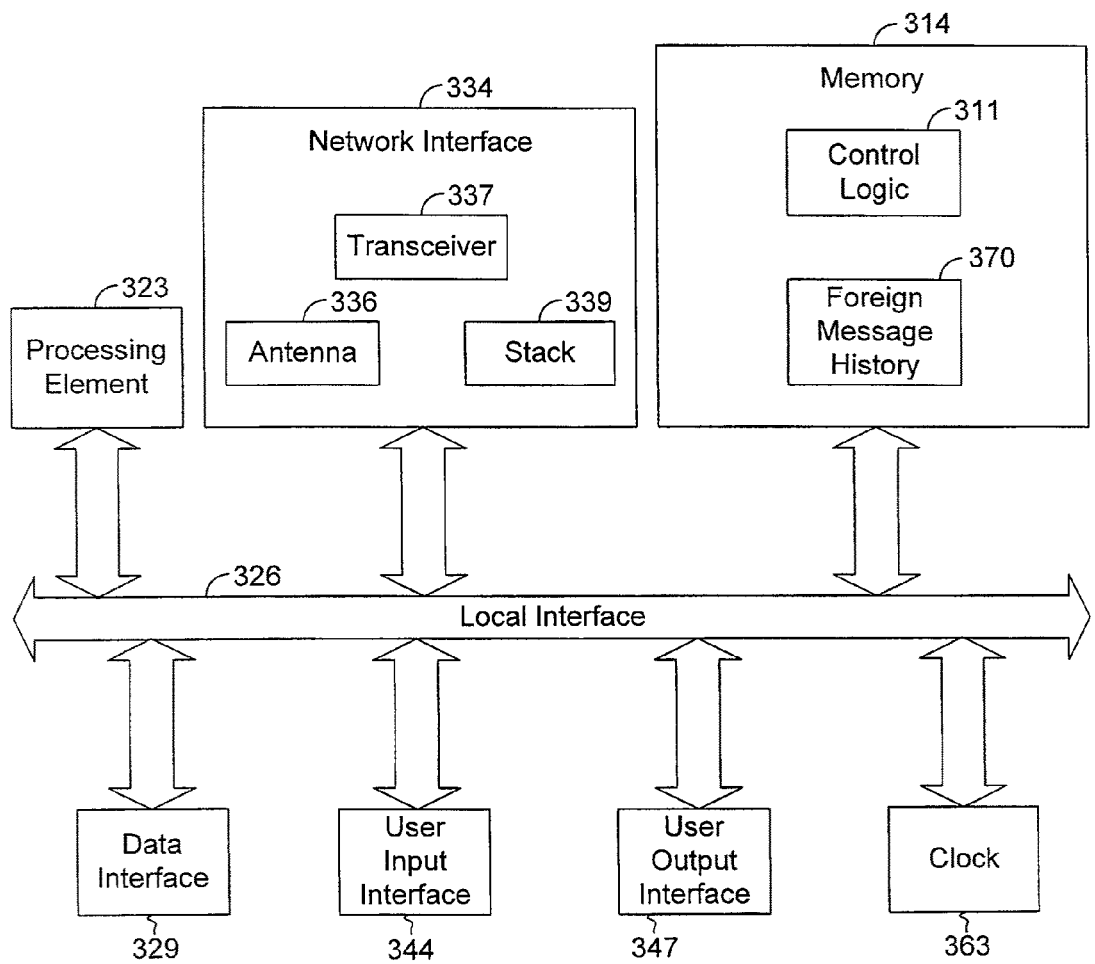
FIG. 3 is a block diagram illustrating an exemplary network node, such as is depicted in FIG. 2.

FIG. 3 depicts a node 25 in accordance with an exemplary embodiment of the present disclosure. As shown by FIG. 3, the node 25 has control logic 311 for generally controlling the operation of the node 25. The control logic 311 can be implemented in software, hardware, firmware, or a combination thereof. In an exemplary embodiment illustrated in FIG. 3, the control logic 311 is implemented in software and stored in memory 314.

Note that the control logic 311, when implemented in software, can be stored and transported on any computer-readable medium for use by or in connection with an instruction execution apparatus that can fetch and execute instructions. In the context of this document, a "computer-readable medium" can be any means that can contain, store, communicate, propagate, or transport a program for use by or in connection with the instruction execution apparatus.

The exemplary embodiment of the node 25 depicted by FIG. 3 comprises at least one conventional processing element 323, such as a digital signal processor (DSP) or a central processing unit (CPU), that communicates to and drives the other elements within node 25 via a local interface 326, which can include at least one bus. Furthermore, a data interface 329, such as a USB port or RS-232 port, allows data to be exchanged with external devices.

The node 25 also has a network interface 334 for enabling communication with other nodes 25. In one exemplary embodiment, the interface 334 is configured to communicate wireless signals, but the interface 334 may communicate with another node 25 via a physical medium, if desired.

As shown by FIG. 3, the network interface 334 has an antenna 336, a transceiver 337, and a protocol stack 339. The stack 339 controls the communication of data between the network interface 334 and the other nodes 25. In one exemplary embodiment, the stack 339 is implemented in software. However, in other embodiments it is possible for the stack 339 to be implemented in hardware, software, firmware, or a combination thereof. When implemented in software, the stack 339 may be stored in the node's memory 314 or other computer-readable medium.

As shown by FIG. 3, the node 25 comprises various user interface devices for enabling information to be exchanged with a user. For example, the node 25 comprises a user input interface 344, such as a keypad, buttons, and/or other types input devices, for enabling a user to enter data or otherwise provide inputs. The node 25 also has a user output interface 347, such as a liquid crystal display device (LCD), for displaying or otherwise indicating information to a user. Other types of user interface devices may be employed in other embodiments. The node 25 also comprises a clock 363 for enabling the tracking of time, as may be desired.

In one exemplary embodiment, the stack 339 is configured to track the messages received by the network interface 334 from foreign networks 30 and to store information 370, referred to hereafter as a "foreign message history," indicative of such received messages in the node's memory 314. In this regard, if the transceiver 337 receives a message that does not include a network identifier that identifies the network 20, then the stack 339 identifies the message as coming from a foreign network 30 and discards the message. However, the stack 339 updates the message history 370 based on the discarded message.

In one exemplary embodiment, for each message identified as being transmitted from a foreign network 30, the stack 339 stores the time (as indicated by the clock 363) that the transceiver 337 began receiving the message, and the stack 339 also stores the time (as indicated by the clock 363) that the transceiver 337 stopped receiving the message. Thus, the length of the message, in terms of time, can be determined by analyzing the foreign message history 370. Note that the start and stop time can be determined by comparing a specified threshold to the energy sensed on the channel by the transceiver 337. If the threshold is exceeded, it can be determined that there is traffic on the channel. Thus, the start time of a message is when the message caused the threshold to be exceeded, and the end time of the message occurs when the sensed energy falls below the threshold after the start time.

In addition, other types of information indicative of a message being recorded may be stored in the foreign message history 370 in other embodiments. For example, if a message type or network identifier can be determined, as described in more detail below, data indicative of the determined message type or network identifier can be stored in the foreign message history 370.

After several messages from at least one foreign network 30 have been received and recorded in the foreign message history 370, the stack 339 analyzes the history 370 in an attempt to identify a transmission pattern associated with a foreign network 30. If such a pattern can be identified, then the stack 339 attempts to schedule at least one transmission of a message, based on the identified pattern, such that the likelihood of a data collision with a message from the foreign network 30 is decreased. For example, if the stack 339 can identify a likely quiet period (i.e., a period in which the foreign network 30 is not transmitting), then the stack 339 schedules a transmission of a message in the identified quiet period and thereafter initiates such a transmission at the scheduled time. Accordingly, the likelihood that the message will collide with a message from the foreign network 30 is reduced.

Note that there are a variety of techniques that may be used to identify transmission patterns and to thereafter exploit the identified transmission patterns in an attempt to reduce data collisions. Some exemplary techniques will be described in more detail hereafter. However, it would be apparent to one of ordinary skill upon reading this disclosure that other techniques not specifically described herein are possible.

In one exemplary embodiment, the stack 339 determines a likely duration for messages communicated by a foreign network 30. In this regard, for each message indicated by the message history 370, the stack 339 determines a duration of transmission by subtracting the time that the message began to be received by the transceiver 337 and the time that the message ended (i.e., stopped being received by the transceiver 337). The stack 339 then performs a statistical comparison of the determined transmission durations to determine if there is a likely transmit duration for messages from foreign networks 30. As a mere example, the stack 339 may count how many of the messages had a transmit duration within a certain range. The stack 339 may do the same for other duration ranges. For each such duration range, the stack 339 determines a value, referred to herein as "percentage value," indicating the percentage of overall messages that are within the range. For example, if there are y total messages indicated by the message history, and if x is the number of such messages having duration between $d_1$ and $d_2$, then the percentage value for the range $d_1$ to $d_2$ is x/y. Thus, a higher percentage value indicates a higher probability that the message from the foreign network 30 is of duration $d_1$ to $d_2$.

In one exemplary embodiment, the stack 339 selects the highest percentage value for any of the ranges and determines whether this percentage value is above a specified threshold. If so, the stack 339 assumes that a message from the foreign network 30 will likely have a duration within the range associated with such percentage value. For example, if the highest percentage of messages is within the range $d_1$ to $d_2$ and if such percentage is above the threshold, the stack 339 assumes that a message being received from the network 30 has a duration from $d_1$ to $d_2$. Based on such range, the stack 339 schedules at least one transmission by the transceiver 337.

In this regard, if the stack 339 is ready to communicate a message, referred to as the "pending message," via transceiver 337, then the stack 339 determines whether the transceiver is sensing a message on the channel. The stack 339 determines that a message is being sensed if the transceiver 337 is sensing energy on the channel above a threshold. If the transceiver 337 is sensing a message, then the stack 339 schedules a transmission of the pending message in $d_2$ seconds. It is likely that, if the energy is from a message (referred to as a "foreign message") being communicated by the foreign network 30, the foreign message will end within $d_2$ seconds, since $d_2$ is the upper end of the expected total duration for such message. Accordingly, when an attempt to transmit the pending message via transceiver 337 occurs, it is likely that the foreign network is no longer communicating the foreign message thereby increasing the probability that the foreign network is in a quiet period relative to node 25. Thus, scheduling transmissions of pending messages in such a manner helps to increase the communication efficiency of the node 25.

Note that the pending message could be scheduled for transmission in $d_2$ seconds after the pending message is otherwise ready for communication when the transceiver 337 is sensing another message currently on the channel. Alternatively, the pending message could be scheduled for transmission in $d_2$ second from the start of the current message on the channel. Such starting time is indicated when the energy sensed on the channel initially exceeds the specified threshold used for determining whether there is traffic on the channel. In other embodiments, the pending message may be scheduled for transmission at different time periods based on the expected duration of the message currently on the channel.

It is common for the nodes of networks to generate replies to messages in predictable patterns. For example, nodes in some networks transmit an acknowledgement after successfully receiving a message. The delay between receiving a message and replying with an acknowledgment (or other type of message) is often approximately the same for different messages.

Figure 4:
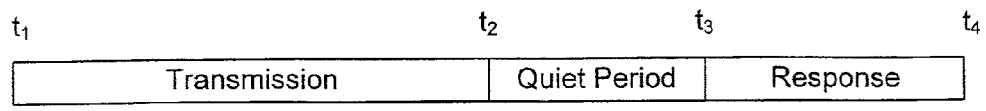
FIG. 4 is a timing diagram illustrating an exemplary transmission/response pair.

In this regard, FIG. 4 depicts a typical timing diagram for a transmission and response, such as an acknowledgment. At time $t_1$, a node (referred to as "receiving node") begins to receive a transmission from another node. At time $t_2$ the transmission ends. At time $t_3$ after $t_2$, the receiving node transmits a response, such as an acknowledgment. At time $t_4$, the transmission of the response ends. Thus, a quiet period exists between time $t_2$ and $t_3$. During this quiet period, it is unlikely that either the transmitting node or the receiving node is attempting to communicate over the network channel.

In one exemplary embodiment, the stack 339 analyzes and compares the timing for successive messages in an attempt to identify a pattern similar to FIG. 4. In this regard, if successive messages have a small delay between them (i.e., the delay is less than a specified threshold), then the stack 339 assumes that the two messages may be a transmission/response pair. The stack 339 determines the duration (i.e., $t_1$ to $t_2$ in FIG. 4) of the transmission by subtracting the start time of the transmission from the end time of the transmission. The stack 339 also determines the duration (i.e., $t_2$ to $t_3$ in FIG. 4) of the quiet period by subtracting the end time of the transmission from the start time of the response, and the stack 339 determines the duration (i.e., $t_3$ to $t_4$ in FIG. 4) of the response by subtracting the start time of the response from the end time of the response. If a significant percentage of the possible transmission/response pairs have durations that match within a specified margin of error, then the stack 339 identifies the pattern of such transmission/response pairs as being the likely pattern for future transmission/response pairs. In this regard, for each possible pattern, the stack determines a percentage of the recorded transmission/response pairs that match the pattern. If the percentage for a particular pattern is the highest relative to other possible transmission/response pairs and exceeds a specified threshold, then the stack 339 identifies the pattern as being the likely pattern for future transmission/response pairs. The stack 339 schedules at least one transmission based on the identified pattern.

For illustrative purposes assume that the pattern depicted by FIG. 4 is a pattern identified by the stack 339 for a foreign network 30. If the stack 339 is ready to transmit a pending message while the transceiver 337 is sensing a message having a duration approximately equal to $t_2$ minus $t_1$, then the stack 337 estimates that a quiet period lasting for about a time period equal to $t_3$ minus $t_1$ will start at the end of the sensed message. Thus, the stack 339 may schedule a transmission of the pending message just after time $t_2$. Further, the stack 339 may appropriately limit the length of the message such that it fits within the expected quiet period and stops prior to time $t_3$ so that the pending message will not likely collide with the response that is expected at time $t_3$. If the entire message cannot be communicated in during the expected quiet period, then the stack 339 may transmit a portion of the message during the expected quiet period between $t_2$ and $t_3$ and the remainder of the message just after time t4.

In another example, rather than attempting communication during the estimated quiet period between $t_2$ and $t_3$, the stack 339 may schedule a transmission of the entire pending message just after time $t_4$. Thus, the stack 339 schedules the pending message such that it is attempted approximately $t_4$ minus $t_1$ seconds after the transceiver 337 began sensing the transmission from the foreign network (i.e., $t_4$ minus $t_1$ seconds from time $t_1$). Note that the time period just after $t_4$ is another expected quiet period for the foreign network 30.

To assist with pattern recognition, the stack 339 may snoop the header information of messages, referred to as "foreign messages," from a foreign network 30. For example, the stack 339 may analyze the header of a message in an attempt to locate a length field that indicates the length of the message. If such a field can be found, the stack 339 may use such information to more precisely calculate the duration of the message. Further, if the length field of a message being received can be found, then the stack 339 can more accurately predict when the message will end and when the following quite period will start.

The stack 339 may search for other types of information in the header in other examples. For example, the stack 339 may search for a field indicative of message type (e.g., whether or not the message is an acknowledgement or another type of message). Such a field may be useful in identifying transmission/response pairs. For example, if the stack 339 determines that a message is an acknowledgement, then the preceding message from the foreign network 30 was likely a transmission of the same transmission/response pair. Further, the expected duration of a message may be based on message type. In this regard, a message of one type may have a typical duration that is different than the typical duration of a message of another type. In analyzing the foreign message history 370, the stack 339 may group the messages indicated by the history 370 into different groups based on message type. For any identified message type, the stack 339 may determine the expected duration of the message by analyzing the messages of the same type according to duration prediction techniques similar to those described above. The stack 339 may use such information to more accurately predict when a message being received will end and, therefore, when the following quiet period will likely start. In this regard, if a message of a certain type is being received, then the stack 339 may be configured to look up the expected duration (if known) for this message type and, based on this duration, to schedule a transmission just after the expected end of the message.

Similarly, if the network identifiers of foreign networks can be read from the headers, then messages may be grouped based on network identifiers. In this regard, messages (even messages of the same type) from different networks may have different lengths. The expected duration of a message may be based on the network identifier in the message. For any identified foreign network 30, the stack 339 may determine the expected duration of a message from such network 30 by analyzing the messages from such foreign network 30 according to duration prediction techniques similar to those described above. The stack 339 may use such information to more accurately predict when a message being received from such network 30 will end and, therefore, when the following quiet period will likely start. In this regard, if a message from an identified foreign network 30 is being received, then the stack 339 may be configured to look up the expected duration (if known) for a message from this network 30 and, based on this duration, to schedule a transmission just after the expected end of the message. Various other types of information from the headers of foreign messages may be useful in identifying patterns and predicting quiet periods.

In one exemplary embodiment, information learned by a node 25 about the patterns of foreign networks 30 is shared with other nodes 25 of the network 20. For example, if a node 25 discerns a transmission pattern of a foreign network 30 by analyzing the foreign message history 370, then the node 25 transmits, to at least one other node 25, information indicative of the learned pattern. Thus, the other node 25 is informed of the learned pattern and can use the pattern to reduce the occurrence of data collisions according to the techniques described herein. Further, even if a pattern is not identified, the foreign message history 370, or at least a portion thereof, generated by one node 25 may be shared with other nodes 25 of the network 20 to provide such nodes with additional data for learning transmission patterns according to the techniques described herein.

An exemplary use and operation of the node 25 in scheduling data transmissions in an attempt to reduce data collisions is described below with particular reference to FIG. 5.

Figure 5:
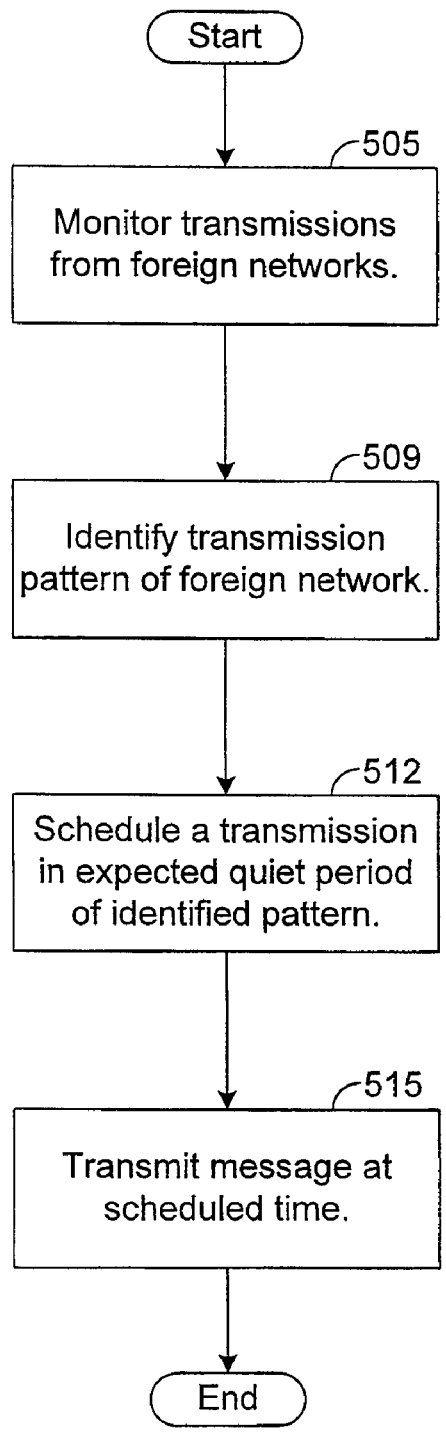
FIG. 5 is a flow chart illustrating an exemplary method for reducing data collisions in a communication network, such as is depicted in FIG. 1.

As shown by block 505 of FIG. 5, the stack 339 monitors transmissions from foreign networks 30 in order to define the foreign message history 370. As shown by block 509, the stack 339 analyzes the foreign message history 370 and, based on such history 370, identifies a transmission pattern for a foreign network 30. For illustrative purposes, assume that the stack 339 determines that transmission/response pairs of the foreign network 30 likely have the pattern shown by FIG. 4. As shown block 512, the stack 339 schedules at least one transmission in an expected quiet period of the identified period.

For illustrative purposes, assume that the stack 339 is ready to communicate a data message that, if defined via a single packet, is too large to fit in the expected quiet period between time $t_2$ and $t_3$ in the pattern shown by FIG. 4. Based on the duration of the expected quiet period between time $t_2$ and $t_3$, the stack 339 packetizes the data message into a plurality of data packets such that at least one data packet fits in such quiet period. The stack 339 then schedules the transmission of at least one data packet small enough to fit in the quiet period just after time $t_2$. If more than one packet can fit in the foregoing quiet period, then the stack 339 may schedule additional data packets to be communicated during the quiet period. However, the stack 339 limits the number of data packets scheduled for transmission during the quiet period such that the transmission of the data packets scheduled during the quiet period is completed prior to time $t_3$ in order to avoid a data collision with the expected response that is likely to commence at time $t_3$.

In addition, the stack 339 does not schedule the transmission of any of the data packets to occur between times $t_3$ and $t_4$. Instead, the stack 339 schedules the transmission of such packets to occur just after time $t_4$. Accordingly, the remainder of the data packets is scheduled for transmission in another expected quiet period, which commences just after time $t_4$. As shown by block 515, the stack 339 commences transmission of the data packets as scheduled.

Now, therefore, the following is claimed:

1. A network node within range of a foreign network such that transmissions by the network node are susceptible to data collisions with transmissions of the foreign network, comprising:

a transceiver; and logic configured to monitor transmissions of the foreign network and to determine durations of the monitored transmissions, the logic configured to identify at least one transmission pattern of the foreign network based on the determined durations, the logic configured to schedule a transmission from the transceiver based on the identified transmission pattern such that the transmission from the transceiver is scheduled to occur during a predicted quiet period for the foreign network, wherein the logic is configured to initiate the transmission during the predicted quiet period, and wherein the logic is configured to determine one of the durations by sensing energy from one of the monitored transmissions and measuring a length of time that the sensed energy exceeds a threshold, wherein the logic is configured to identify successive transmissions from the foreign network as a transmission/response pair based on a delay between the successive transmissions, and wherein the logic is configured to identify the transmission pattern based on identification of the successive transmissions as a transmission/response pair.

2. The network node of claim 1, wherein the logic is configured to estimate a duration of the quiet period based on the identified transmission pattern, and wherein the logic is configured to limit a length of the transmission from the transceiver based on the estimated duration.

3. The network node of claim 1, wherein the network node is configured to snoop a header of a data packet received from the foreign network, and wherein the network node is configured to identify the transmission pattern based on the header.

4. The network node of claim 1, wherein the logic is configured to transmit information indicative of the identified pattern to another network node.

5. The network node of claim 1, wherein the logic is configured to search the one transmission for a network identifier identifying a wireless network in which the network node communicates, and wherein the logic is configured to identify the one transmission as being transmitted by the foreign network in response to a determination that the network identifier is not included in the one transmission.

6. The network node of claim 1, wherein the logic is configured to determine a start time for the one transmission based on the sensed energy and to determine a stop time for the one transmission based on the sensed energy, and wherein the logic is configured to determine the one duration based on a difference between the start time and the stop time.

7. The network node of claim 1, wherein the logic is configured to perform a statistical comparison of the determined durations and to identify the transmission pattern based on the statistical comparison.

8. The network node of claim 1, wherein the logic is configured measure a duration of the delay and to compare the measured duration to a specified threshold.

9. A method for reducing data collisions in network communications, comprising the steps of:
receiving transmissions of a foreign network;
storing data indicative of the received transmissions;
analyzing the data;
determining durations of the received transmissions;
identifying a transmission pattern of the foreign network based on the analyzing and determining steps;
predicting a quiet period for the foreign network based on the identified transmission pattern and at least one transmission received from the foreign network;
transmitting a message during the quiet period based on the predicting step;
sensing energy from the at least one transmission;
measuring a duration of a delay between successive transmissions from the foreign network; and
identifying the successive transmissions as a transmission/response pair based on the measured duration of the delay,
wherein the identifying the transmission pattern step is based on the identifying the successive transmissions step, and wherein the determining step comprises the step of measuring a length of time that the sensed energy exceeds a threshold.

10. The method of claim 9, further comprising the steps of:
estimating a duration of the quiet period based on the identified transmission pattern; and
controlling a length of the message based on the estimated duration.

11. The method of claim 9, further comprising the step of snooping a header of one of the received transmissions, wherein the identifying the transmission pattern step is based on the snooping step.

12. The method of claim 9, further comprising the steps of:
searching the at least one transmission for a particular network identifier identifying a wireless network through which the message is transmitted;
determining whether the network identifier is included in the at least one transmission; and
associating the at least one transmission with the foreign network in response to the determining whether the network identifier is included in the at least one transmission step.

13. The method of claim 9, wherein the measuring step comprises the steps of:
determining a start time for the at least one transmission based on the sensed energy;
determining a stop time for the at least one transmission based on the sensed energy; and
determining a difference between the start time and the stop time.

14. The method of claim 9, further comprising the step of statistically comparing the determined durations, wherein the identifying the transmission pattern step is based on the statistically comparing step.

15. The method of claim 9, further comprising the step of comparing the measured duration of the delay to a threshold.

* * * * *